United States Patent
Jun et al.

(10) Patent No.: US 12,244,017 B2
(45) Date of Patent: Mar. 4, 2025

(54) BINDER FOR NEGATIVE ELECTRODE OF LITHIUM SECONDARY BATTERY AND NEGATIVE ELECTRODE FOR LITHIUM SECONDARY BATTERY INCLUDING THE SAME

(71) Applicant: LG ENERGY SOLUTION, LTD., Seoul (KR)

(72) Inventors: Chan-Soo Jun, Daejeon (KR); Young-Jae Kim, Daejeon (KR); Ye-Lin Kim, Daejeon (KR); Jung-Woo Yoo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 666 days.

(21) Appl. No.: 17/607,699

(22) PCT Filed: Sep. 3, 2020

(86) PCT No.: PCT/KR2020/011894
§ 371 (c)(1),
(2) Date: Oct. 29, 2021

(87) PCT Pub. No.: WO2021/060737
PCT Pub. Date: Apr. 1, 2021

(65) Prior Publication Data
US 2022/0216479 A1    Jul. 7, 2022

(30) Foreign Application Priority Data
Sep. 23, 2019 (KR) .................. 10-2019-0116992

(51) Int. Cl.
*H01M 4/134*    (2010.01)
*H01M 4/38*    (2006.01)
(Continued)

(52) U.S. Cl.
CPC ........... *H01M 4/622* (2013.01); *H01M 4/386* (2013.01); *H01M 4/48* (2013.01); *H01M 10/052* (2013.01);
(Continued)

(58) Field of Classification Search
None
See application file for complete search history.

(56) References Cited

U.S. PATENT DOCUMENTS

| | | |
|---|---|---|
| 2014/0057170 A1 | 2/2014 | Cha et al. |
| 2015/0155561 A1 | 6/2015 | Kim et al. |

(Continued)

FOREIGN PATENT DOCUMENTS

| | | |
|---|---|---|
| CN | 1927935 A | 3/2007 |
| CN | 104272508 A | 1/2015 |

(Continued)

OTHER PUBLICATIONS

English translation of KR 2017/0076592 (Year: 2017).*
(Continued)

*Primary Examiner* — Yoshitoshi Takeuchi
(74) *Attorney, Agent, or Firm* — Birch, Stewart, Kolasch & Birch, LLP

(57) ABSTRACT

A negative electrode for a lithium secondary battery having excellent dispersibility, adhesion and tensile strength, and a lithium secondary battery including the same. The negative electrode for a lithium secondary battery includes negative electrode active material particles, a conductive material and a binder. The binder includes a copolymer comprising acrylamide monomer-derived repeating units, acrylic acid monomer-derived repeating units, sodium acrylate monomer-derived repeating units and acrylonitrile monomer-derived repeating units. The combined weight of the acrylic acid monomer-derived repeating units and sodium acrylate
(Continued)

monomer-derived repeating units in the copolymer is 25 wt % to 35 wt %. The negative electrode active material particles are silicon-based negative electrode active material particles.

7 Claims, 4 Drawing Sheets

(51) Int. Cl.
  *H01M 4/48* (2010.01)
  *H01M 4/62* (2006.01)
  *H01M 10/052* (2010.01)
  *H01M 4/02* (2006.01)

(52) U.S. Cl.
  CPC ............... *H01M 2004/021* (2013.01); *H01M 2004/027* (2013.01)

(56) References Cited

U.S. PATENT DOCUMENTS

| | | | | |
|---|---|---|---|---|
| 2015/0357647 | A1* | 12/2015 | Kurata | H01M 4/622 524/820 |
| 2016/0204439 | A1* | 7/2016 | Sonobe | H01M 4/583 524/45 |
| 2016/0359156 | A1 | 12/2016 | Ohkubo | |
| 2018/0108912 | A1* | 4/2018 | Kang | H01M 4/131 |
| 2018/0351177 | A1* | 12/2018 | Kang | C08L 15/00 |
| 2019/0058195 | A1* | 2/2019 | Hanasaki | H01M 4/587 |
| 2020/0235395 | A1* | 7/2020 | Yoon | C08L 33/26 |
| 2021/0189037 | A1 | 6/2021 | Pan et al. | |

FOREIGN PATENT DOCUMENTS

| | | | |
|---|---|---|---|
| CN | 104448158 A | | 3/2015 |
| CN | 105960721 A | | 9/2016 |
| CN | 108140840 A | | 6/2018 |
| CN | 1088321250 A | | 11/2018 |
| JP | 2015-22956 A | | 2/2015 |
| JP | 2015-106488 A | | 6/2015 |
| JP | 2015-1535290 A | | 8/2015 |
| JP | WO2015/1467870 A1 | | 4/2017 |
| JP | 2018-195509 A | | 12/2018 |
| KR | 10-2014-0026856 A | | 3/2014 |
| KR | 10-2015-0063270 A | | 6/2015 |
| KR | 10-2015-0070861 A | | 6/2015 |
| KR | 10-2016-0033692 A | | 3/2016 |
| KR | 10-1686475 B1 | | 12/2016 |
| KR | 10-2017-0076592 A | | 7/2017 |
| KR | 2017/0076592 | * 7/2017 | ............... C08K 3/08 |
| KR | 10-2018-0095040 A | | 8/2018 |
| KR | 10-2019-00399930 A | | 4/2019 |
| WO | WO 2019/073820 A1 | | 4/2019 |

OTHER PUBLICATIONS

International Search Report for PCT/KR2020/011894 mailed on Dec. 21, 2020.

European Patent Office Search Report dated Oct. 14, 2022 for European Patent Application No. 20867099.2.

* cited by examiner

BINDER FOR NEGATIVE ELECTRODE OF LITHIUM SECONDARY BATTERY AND NEGATIVE ELECTRODE FOR LITHIUM SECONDARY BATTERY INCLUDING THE SAME

TECHNICAL FIELD

The present disclosure relates to a binder for a negative electrode of a lithium secondary battery, and a negative electrode for a lithium secondary battery including the same.

The present application claims priority to Korean Patent Application No. 10-2019-0116992 filed on Sep. 23, 2019 in the Republic of Korea, the disclosures of which are incorporated herein by reference.

BACKGROUND ART

As technical development and needs for mobile instruments have been increased, secondary batteries as energy sources for such mobile instruments have been increasingly in demand. Among such secondary batteries, lithium secondary batteries having high energy density and operating voltage, long cycle life and a low discharge rate have been commercialized and used widely.

An electrode of a lithium secondary battery is obtained by mixing a positive electrode active material or negative electrode active material with a binder resin ingredient, dispersing the resultant mixture in a solvent to prepare a composition (slurry), and applying the slurry to the surface of an electrode current collector, followed by drying to form a mixture layer.

The binder is used to ensure the adhesion or binding force among active materials, or between an active material and an electrode current collector, but an excessive amount of binder is required to improve the adhesion between an electrode current collector and an active material. However, such an excessive amount of binder causes degradation of the capacity and conductivity of an electrode undesirably. On the other hand, insufficient adhesion causes interlayer separation in an electrode, while processing the electrode through drying, pressing, or the like, and thus becomes a cause of increase in electrode defects. In addition, an electrode having low adhesion may undergo interlayer separation by external impact, and such interlayer separation causes an increase in contact resistance between an electrode material and a current collector, resulting in degradation of electrode output performance.

Particularly, during the charge/discharge of a lithium secondary battery, a change in volume of a negative electrode active material occurs due to reaction with lithium, the negative electrode active material may be detached from the current collector during continuous charge/discharge, and resistance may be increased due to a change in contact interface between active materials, resulting in the problems of a rapid decrease in capacity and degradation of cycle life, while charge/discharge cycles are repeated. In addition, when using materials, such as silicon, tin and silicon-tin alloy, in combination in order to increase discharge capacity, silicon and tin cause a larger change in volume due to reaction with lithium, which makes the above-mentioned problems more serious.

Meanwhile, styrene-butadiene rubber and carboxymethyl cellulose, which are referred to as aqueous binders by virtue of their water solubility, have an advantage of providing eco-friendly characteristics and strong adhesion. On the other hand, use of styrene-butadiene rubber or carboxymethyl cellulose alone is not suitable for satisfying both dispersibility and adhesion. Therefore, both styrene-butadiene rubber and carboxymethyl cellulose should be used as a two-part binder, resulting in degradation of processability and cost-efficiency.

Therefore, it is necessary to provide a binder for a negative electrode of a lithium secondary battery, which can be dispersed well in an electrode mixture slurry, particularly a negative electrode mixture slurry, can improve the adhesion among the ingredients forming an electrode, can provide higher tensile strength to an electrode, and can simplify the overall process, and an electrode of a lithium secondary battery including the binder.

DISCLOSURE

Technical Problem

The present disclosure is designed to solve the problems of the related art, and therefore the present disclosure is directed to providing a binder for a negative electrode of a lithium secondary battery, which can be dispersed well in a negative electrode mixture slurry, can improve the adhesion among the ingredients of the negative electrode, and allows the negative electrode to have higher tensile strength.

The present disclosure is also directed to providing a one-part binder for a negative electrode of a lithium secondary battery, which can be dispersed well in a negative electrode mixture slurry, can improve the adhesion among the ingredients of the negative electrode, and allows the negative electrode to have higher tensile strength.

In addition, the present disclosure is directed to providing a negative electrode for a lithium secondary battery, which includes the binder for a negative electrode of a lithium secondary battery.

Further, the present disclosure is directed to providing a lithium secondary battery including the negative electrode for a lithium secondary battery.

Technical Solution

In one aspect of the present disclosure, there is provided a binder for a negative electrode of a lithium secondary battery according to any one of the following embodiments. According to the first embodiment of the present disclosure, there is provided a binder for a negative electrode of a lithium secondary battery, which includes a copolymer comprising acrylamide monomer-derived repeating units, acrylic acid monomer-derived repeating units, sodium acrylate monomer-derived repeating units and acrylonitrile monomer-derived repeating units, wherein the combined weight of the acrylic acid monomer-derived repeating units and sodium acrylate monomer-derived repeating units in the copolymer is 25 wt % to 35 wt %.

According to the second embodiment of the present disclosure, there is provided the binder for a negative electrode of a lithium secondary battery as defined in the first embodiment, wherein the copolymer consists of acrylamide monomer-derived repeating units, acrylic acid monomer-derived repeating units, sodium acrylate monomer-derived repeating units and acrylonitrile monomer-derived repeating units.

According to the third embodiment of the present disclosure, there is provided the binder for a negative electrode of a lithium secondary battery as defined in the first or the second embodiment, wherein the copolymer includes 60 wt % to 65 wt % of acrylamide monomer-derived repeating units, 5 wt % to 10 wt % of acrylic acid monomer-derived repeating units, 15 wt % to 25 wt % of sodium acrylate monomer-derived repeating units and 5 wt % to 15 wt % of acrylonitrile monomer-derived repeating units.

According to the fourth embodiment of the present disclosure, there is provided the binder for a negative electrode of a lithium secondary battery as defined in any one of the first to the third embodiments, wherein the binder is present in particle form.

In another aspect of the present disclosure, there is provided a negative electrode for a lithium secondary battery according to any one of the following embodiments. According to the fifth embodiment of the present disclosure, there is provided a negative electrode for a lithium secondary battery, which includes negative electrode active material particles, a conductive material and a binder, wherein the binder is the binder for a negative electrode of a lithium secondary battery as defined in any one of the first to the fourth embodiments, and the negative electrode active material particles are silicon-based negative electrode active material particles.

According to the sixth embodiment of the present disclosure, there is provided the negative electrode for a lithium secondary battery as defined in the fifth embodiment, wherein the acrylamide monomer-derived repeating units in the copolymer are disposed toward the surface of the negative electrode active material particles, and the acrylonitrile monomer-derived repeating units are disposed in the direction opposite to the surface of the negative electrode active material particles.

According to the seventh embodiment of the present disclosure, there is provided the negative electrode for a lithium secondary battery as defined in the fifth or the sixth embodiment, wherein the negative electrode active material particles are Si- or SiO-based active material particles.

According to the eighth embodiment of the present disclosure, there is provided the negative electrode for a lithium secondary battery as defined in any one of the fifth to the seventh embodiments, which has a tensile strength of 80 MPa to 120 MPa.

According to the ninth embodiment of the present disclosure, there is provided the negative electrode for a lithium secondary battery as defined in any one of the fifth to the eighth embodiments, which has an adhesion force of 15 gf/15 mm to 100 gf/15 mm.

In still another aspect, according to the tenth embodiment of the present disclosure, there is provided a lithium secondary battery including the negative electrode for a lithium secondary battery as defined in any one of the fifth to the ninth embodiments.

Advantageous Effects

The binder for a negative electrode of a lithium secondary battery can be dispersed well in a negative electrode mixture slurry used for manufacturing a negative electrode for a lithium secondary battery, i.e. a negative electrode mixture slurry prepared by using an active material, a binder and a conductive material as main ingredients. Particularly, the binder for a negative electrode of a lithium secondary battery according to the present disclosure can be positioned suitably at the contact points among the active materials, between the active material and the conductive material, and between the active material and a current collector, and thus helps the ingredients of the negative electrode to be bound strongly with one another.

The binder for a negative electrode of a lithium secondary battery according to the present disclosure includes an ingredient providing strong hydrogen bonding in its ingredients, and thus can be dispersed homogeneously in an aqueous dispersion medium.

The binder for a negative electrode of a lithium secondary battery according to the present disclosure shows a synergic effect of strong adhesion with excellent dispersibility, and thus can significantly reduce a deterioration phenomenon of separation of a negative electrode active material, such as a Si- or SiO-based negative electrode active material, undergoing high volumetric swelling during charge/discharge.

The negative electrode for a lithium secondary battery according to the present disclosure includes main ingredients, i.e. an active material, a binder and a conductive material, dispersed homogeneously over the whole negative electrode active material layer. Particularly, in the negative electrode for a lithium secondary battery according to the present disclosure, the binder according to the present disclosure can be positioned suitably at the contact points among the active materials, between the active material and the conductive material, and between the active material and a current collector, and thus the ingredients of the negative electrode may be bound strongly with one another.

In addition, in the negative electrode for a lithium secondary battery according to the present disclosure, the binder includes strong hydrogen bonding and is highly homogeneously dispersed in an aqueous medium. Therefore, when using a negative electrode active material, such as a Si- or SiO-based negative electrode active material, undergoing high volumetric swelling during charge/discharge, it is possible to significantly reduce the problem of the related art, i.e. separation of the Si- or SiO-based negative electrode active material from the contact with another constitutional ingredient.

Further, the lithium secondary battery including the electrode according to the present disclosure shows a high capacity retention.

BEST MODE

Figure 1:
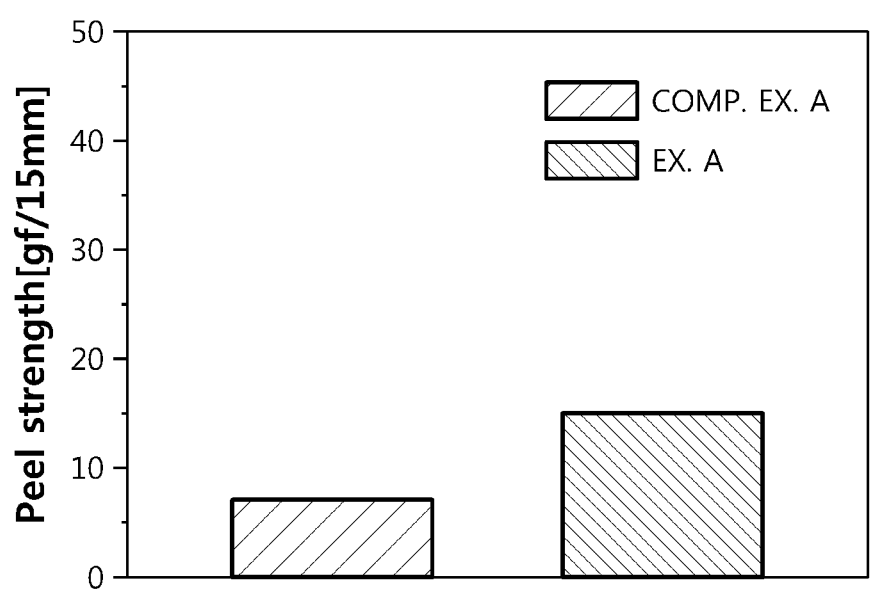
FIG. 1 is a graph illustrating the peel strength of the negative electrode according to an embodiment of the present disclosure.

Hereinafter, preferred embodiments of the present disclosure will be described in detail with reference to the accompanying drawings.

Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a binder for a negative electrode of a lithium secondary battery, which includes a copolymer containing acrylamide monomer-derived repeating units, acrylic acid monomer-derived repeating units, sodium acrylate monomer-derived repeating units and acrylonitrile monomer-derived repeating units, wherein the combined weight of the acrylic acid monomer-derived repeating units and sodium acrylate monomer-derived repeating units in the copolymer is 25-35 wt %.

Particularly, the binder for a negative electrode of a lithium secondary battery according to the present disclosure includes a copolymer containing acrylamide monomer-derived repeating units, acrylic acid monomer-derived repeating units, sodium acrylate monomer-derived repeating units and acrylonitrile monomer-derived repeating units, but it does not include styrene butadiene rubber or carboxymethyl cellulose.

According to an embodiment of the present disclosure, the binder for a negative electrode of a lithium secondary battery is a copolymer substantially including acrylamide monomer-derived repeating units, acrylic acid monomer-derived repeating units, sodium acrylate monomer-derived repeating units and acrylonitrile monomer-derived repeating units.

As used herein, the expression 'substantially including' is intended to cover an embodiment including a small amount of additives or a undesired trace amount of impurities, wherein the additives or impurities have no significant effect upon the desired effects of the binder for a negative electrode of a lithium secondary battery according to the present disclosure.

According to an embodiment of the present disclosure, the binder for a negative electrode of a lithium secondary battery is a copolymer consisting of acrylamide monomer-derived repeating units, acrylic acid monomer-derived repeating units, sodium acrylate monomer-derived repeating units and acrylonitrile monomer-derived repeating units.

According to an embodiment of the present disclosure, the binder for a negative electrode of a lithium secondary battery is a copolymer including 60-65 wt % of acrylamide monomer-derived repeating units, 5-10 wt % of acrylic acid monomer-derived repeating units, 15-25 wt % of sodium acrylate monomer-derived repeating units and 5-15 wt % of acrylonitrile monomer-derived repeating units.

According to an embodiment of the present disclosure, when the acrylamide monomer-derived repeating units are present in an amount of 60-65 wt %, it is possible to prevent the problem of a failure in improvement of the adhesion of a negative electrode to a desired level, caused by a content of the acrylamide monomer-derived repeating units of less than 60 wt % in the copolymer, and the problem of loss of the flexibility of a negative electrode, particularly a negative electrode active material layer, having high brittleness caused by a content of the acrylamide monomer-derived repeating units of larger than 65 wt % in the copolymer.

As used herein, 'brittleness' of a negative electrode refers to a negative electrode not present in a flexible state but in a significantly rigid and hardened state, after the negative electrode is formed by coating and drying the negative electrode mixture slurry on the negative electrode current collector. Such a negative electrode undergoes cracking, particularly on the negative electrode active material layer, when it is subjected to a roll-to-roll pressing process during the manufacture thereof, which makes it difficult to fabricate a negative electrode.

According to an embodiment of the present disclosure, when the acrylic acid monomer-derived repeating units are present in an amount of 5-10 wt %, it is possible to prevent the problem of poor dispersibility of the negative electrode mixture slurry during agitation, caused by a content of the acrylic acid monomer-derived repeating units of less than 5 wt % in the copolymer, and the problem of loss of the flexibility of a negative electrode, particularly a negative electrode active material layer, having high brittleness caused by a content of the acrylic acid monomer-derived repeating units of larger than 10 wt % in the copolymer.

According to an embodiment of the present disclosure, when the sodium acrylate monomer-derived repeating units are present in an amount of 15-25 wt %, it is possible to prevent the problem of a failure in significant improvement of the dispersibility of the negative electrode mixture slurry, caused by a content of the sodium acrylate monomer-derived repeating units of less than 15 wt % in the copolymer; and the problems of generation of a large amount of air bubbles during the agitation of the negative electrode mixture slurry, aggregation of conductive materials among themselves and that of active materials among themselves upon the burst of the air bubbles, and degradation of dispersibility, caused by a content of the sodium acrylate monomer-derived repeating units of larger than 25 wt % in the copolymer.

According to an embodiment of the present disclosure, the acrylonitrile monomer-derived repeating unit is an ingredient contained in the copolymer to realize hydrophobicity. When the acrylonitrile monomer-derived repeating units are present in an amount of 5-15 wt %, it is possible to prevent the problem of high affinity of a finished negative electrode to water and a high content of water of the negative electrode, caused by a content of the acrylonitrile monomer-derived repeating units of less than 5 wt % in the copolymer, and the problem of a decrease in surface tension of the copolymer, an increase in contactability with air, and generation of a large amount of air bubbles during agitation for mixing the ingredients of the negative electrode introduced to the dispersion medium, caused by a content of the acrylonitrile monomer-derived repeating units of larger than 15 wt % in the copolymer.

According to the present disclosure, the combined weight of the acrylic acid monomer-derived repeating units and the sodium acrylate monomer-derived repeating units is 25-35 wt % in the copolymer. When the combined weight of the acrylic acid monomer-derived repeating units and the sodium acrylate monomer-derived repeating units is less than 25 wt %, the negative electrode mixture slurry cannot be dispersed homogeneously during agitation, and aggregation of particles among themselves occurs. When the combined weight of the acrylic acid monomer-derived repeating units and the sodium acrylate monomer-derived repeating units is larger than 35 wt %, a large amount of bubbles is generated during agitation, and a negative electrode obtained by using such a copolymer as a binder for a negative electrode of a lithium secondary battery shows brittleness.

The binder for a negative electrode of a lithium secondary battery includes a dispersion medium in which the copolymer containing acrylamide monomer-derived repeating units, acrylic acid monomer-derived repeating units, sodium acrylate monomer-derived repeating units and the acrylonitrile monomer-derived repeating units is contained in the form of particles, wherein OH—O, OH—N, NH—O and NH—N functional groups form hydrogen bonding with each other among the functional groups present in the monomers, and —$NH_2$, —OH and —$CONH_2$ functional groups having high aggregative energy allow the binder particles to be positioned at the contact positions among the active material particles.

According to an embodiment of the present disclosure, the copolymer is attached to the active material particles and/or conductive material particles in such a manner that the acrylamide (PAM) monomer-derived repeating units in the negative electrode mixture slurry are disposed toward the surface of the active material particles and/or conductive active material particles. The acrylamide monomer-derived repeating units are attached to the surface of the active material particles, while being disposed toward the surface of the active material particles, even after forming a negative electrode from the negative electrode mixture slurry.

According to an embodiment of the present disclosure, in the copolymer of the negative electrode mixture slurry, the acrylic acid (PAA) monomer-derived repeating units and sodium acrylate (PAA-$Na^+$) monomer-repeating units are disposed in the opposite direction to the attachment to the conductive material particles or active material particles.

While the acrylonitrile monomer-derived repeating units are disposed in the opposite direction to the attachment to the conductive material particles and/or active material particles, they prevent air bubbles from being entrapped in the binder due to hydrophobicity and a decrease in contactability with air.

According to an embodiment of the present disclosure, the acrylamide monomer-derived repeating units used for the copolymer may have a weight average molecular weight of $4 \times 10^6$-$7 \times 10^6$. When using acrylamide monomer-derived repeating units having a weight average molecular weight smaller than the lower limit, the negative electrode finished by using the copolymer as a binder for a negative electrode of a lithium secondary battery shows poor adhesion. When using acrylamide monomer-derived repeating units having a weight average molecular weight larger than the upper limit, the negative electrode finished by using the copolymer as a binder for a negative electrode of a lithium secondary battery shows brittleness.

According to an embodiment of the present disclosure, the acrylic monomer-derived repeating units used for the copolymer may have a weight average molecular weight of $1 \times 10^5$-$6 \times 10^5$. When using acrylic acid monomer-derived repeating units having a weight average molecular weight smaller than the lower limit, homogeneous dispersion cannot be made during the agitation of the copolymer as a binder for a negative electrode of a lithium secondary battery with the active material and conductive material. When using acrylic acid monomer-derived repeating units having a weight average molecular weight larger than the upper limit, a large amount of air bubbles is generated during agitation for mixing the negative electrode mixture slurry, and the negative electrode finished by using the copolymer as a binder for a negative electrode of a lithium secondary battery shows brittleness.

According to an embodiment of the present disclosure, the sodium acrylate monomer-derived repeating units used for the copolymer may have a weight average molecular weight of $2,000$-$1 \times 10^5$. When sodium acrylate monomer-derived repeating units having a weight average molecular weight smaller than the lower limit, homogeneous dispersion cannot be made during the agitation of the copolymer as a binder for a negative electrode of a lithium secondary battery with the active material and conductive material. When using sodium acrylate monomer-derived repeating units having a weight average molecular weight larger than the upper limit, a large amount of air bubbles is generated during agitation for mixing the negative electrode mixture slurry, and the negative electrode finished by using the copolymer as a binder for a negative electrode of a lithium secondary battery shows brittleness.

According to an embodiment of the present disclosure, polyacrylonitrile used for the copolymer may have a weight average molecular weight of $1 \times 10^4$-$1 \times 10^5$. When using acrylonitrile monomer-derived repeating units having a weight average molecular weight smaller than the lower limit, contactability between the negative electrode mixture slurry and air is increased during agitation for mixing the negative electrode mixture slurry using the copolymer as a binder for a negative electrode of a lithium secondary battery to cause generation of a large amount of air bubbles, and the finished negative electrode has increased water adsorption property. When using acrylonitrile monomer-derived repeating units having a weight average molecular weight larger than the upper limit, the negative electrode mixture slurry using the copolymer as a binder for a negative electrode of a lithium secondary battery has increased viscosity, thereby making it difficult to agitate the negative electrode mixture slurry.

According to an embodiment of the present disclosure, the binder for a negative electrode of a lithium secondary battery including the copolymer is provided in the form of particles which may have an average particle diameter ($D_{50}$) of 100 nm to 1 μm, or 300-500 nm. Herein, $D_{50}$ means a particle diameter at a point of 50% in the particle number accumulated distribution depending on particle diameter, and may be determined by using a laser diffraction method. Particularly, powder to be determined is dispersed in a dispersion medium and introduced to a commercially available laser diffraction particle size analyzer (e.g. Microtrac S3500), and then a difference in diffraction pattern depending on particle size is determined, when particles pass through laser beams, and then particle size distribution is calculated. Then, the particle diameter at a point of 50% of the particle number accumulated distribution depending on particle diameter is calculated to determine $D_{50}$.

When the binder for a negative electrode of a lithium secondary battery has the above-defined average particle diameter ($D_{50}$), it is possible to realize a suitable level of adhesion, to reduce swelling with an electrolyte, and to realize suitable elasticity so that a change in thickness of the negative electrode may be accepted and gas generation may be reduced.

According to an embodiment of the present disclosure, the dispersion medium in which the binder for a negative electrode of a lithium secondary battery is dispersed may include water, acetone, ethanol, or a mixture of two or more of them.

According to an embodiment of the present disclosure, the binder for a negative electrode of a lithium secondary battery may have a viscosity of 10000-25000 mPa s at a shear rate of 1 l/s at 25° C. When the binder for a negative electrode of a lithium secondary battery has the above-defined range of viscosity, it is possible to realize a dispersion effect during agitation for mixing the negative electrode mixture slurry. The viscosity is a value of rheological property determined at 25° C. by using TA instrument Trios.

The binder for a negative electrode of a lithium secondary battery according to the present disclosure is a one-part binder for a negative electrode of a lithium secondary battery, which has excellent dispersibility and can be stored in a single container. In addition, the binder for a negative electrode of a lithium secondary battery has excellent dispersibility to allow homogeneous dispersion between the active material and the conductive material.

The dispersibility of a binder for a negative electrode of a lithium secondary battery may be evaluated in two aspects, i.e. in terms of a filter test item and viscosity.

First, when the dispersibility of the binder for a negative electrode of a lithium secondary battery is evaluated in terms of a filter test item, 17.14 g of the binder for a negative electrode of a lithium secondary battery is introduced to 300 mL of a dispersion medium at room temperature to prepare 300 mL of a binder dispersion, and then an active material, a conductive material and the binder were agitated at a ratio of 70:10:20 under 2000 rpm by using a homodisper (Primix Co.). The agitated electrode mixture slurry is screened through a 100 mesh screening net and the screened material is observed by the naked eyes. When crude particles of aggregates formed from the non-dispersed active material and binder remain on the mesh screening net, the binder is evaluated to have low dispersibility. When little or no binder agglomerates remain on the mesh screening net, the binder is evaluated to have high dispersibility.

When the dispersibility of the binder for a negative electrode of a lithium secondary battery is evaluated in terms of viscosity, shear rheological property (shear rate) is determined, 10 mL of a negative electrode mixture slurry prepared with a composition of an active material:conductive material:binder of 70:10:20 is introduced to a rheological property analyzer (TA instrument Trios) at room temperature, and then viscosity is measured as a function of shear rate in a range from 0.01 to 1000 l/s at 25° C. When the binder has a viscosity of 500-10000 mPa·s at a shear rate of 1 l/s, it can be judged that the binder has preferred dispersibility in terms of processing, particularly in terms of agitation. When the viscosity is less than 500 mPa s, it is not possible to carry out coating suitably to cause a problem during a coating process. When the viscosity is larger than 10000 mPa s, a high pump conveying pressure is applied, thereby causing a problem in terms of processing.

According to an embodiment of the present disclosure, the binder for a negative electrode of a lithium secondary battery may be obtained by the method including the following steps (S1) to (S4), but is not limited thereto:

- (S1) An acrylonitrile polymer is prepared. First, acrylonitrile is mixed with an organic solvent for polymer synthesis, the mixture is introduced to an ice bath to carry out photo-polymerization, and the resultant product is freeze-dried to obtain polyacrylonitrile (PAN). Herein, the organic solvent for polymer synthesis may be bromoform. Acrylonitrile and the organic solvent for polymer synthesis may be mixed at a volume ratio of 1.5:1-2:1.
- (S2) The resultant polyacrylonitrile is polymerized with acrylic acid to obtain a copolymer thereof. First, polyacrylonitrile and acrylic acid are mixed in an organic solvent for polymer synthesis and photo-polymerization is carried out for 45-90 minutes, followed by freeze-drying. The organic solvent for polymer synthesis may be a mixture of benzene with bromoform. In this manner, polyacrylonitrile-co-polyacrylic acid (PAN-PAA) is obtained.
- (S3) Then, PAN-PAA and methyl acrylate are dissolved and agitated in benzene, benzoyl peroxide is introduced thereto as an initiator, 1-butanethiol is introduced as a reactant, and the resultant mixture is warmed to a temperature of 110° C. under nitrogen atmosphere. After carrying out reaction for 4 hours, the initiator and monomers are washed with methanol. The resultant powdery particles are introduced to an excessive amount of n-hexane, an excessive amount of NaOH solution is introduced thereto to substitute methyl groups of methyl acrylate with Na cations, and the resultant powdery particles are dried. Instead of an excessive amount of NaOH, an excessive amount of KOH or LiOH may be used so that methyl groups of methyl acrylate may be substituted with metal cations, such as Li or K cations, instead of Na cations.
- (S4) The resultant PAN-PAA-PAA $Na^+$ copolymer is introduced to an organic solvent for polymer synthesis, acrylamide is introduced thereto under an oxygen-free condition, and photo-polymerization is carried out under a sealed environment. The photo-polymerization may be carried out at a temperature of 25-35° C. for 1.5-2.5 hours. Powdery particles are obtained as a final product, and then the particles are freeze-dried.

In this manner, obtained is a copolymer containing acrylamide monomer-derived repeating units, acrylic acid monomer-derived repeating units, sodium acrylate monomer-derived repeating units and acrylonitrile monomer-derived repeating units.

Herein, based on 5-15 wt % of acrylonitrile monomer, 5-10 wt % of acrylic acid, 60-65 wt % of acrylamide and 15-25 wt % of methyl methacrylate may be used.

The binder for a negative electrode of a lithium secondary battery according to the present disclosure has excellent adhesion. Thus, when using the binder for a negative electrode mixture slurry, it can be positioned suitably at the contact points among the active materials, between the active material and conductive material, and between the active material and current collector, and thus contributes to strong binding formed among the ingredients of the negative electrode.

According to an embodiment of the present disclosure, the binder for a negative electrode of a lithium secondary battery has such a level of adhesion that the finished negative electrode active material layer may not have brittleness. More particularly, the binder allows the negative electrode active material layer to have an adhesion force of 15 gf/15 mm or more, 17 gf/15 mm or more, or 20 gf/15 mm or more, wherein the upper limit of the adhesion force may be 100 gf/15 mm. When the negative electrode active material layer including the binder for a negative electrode of a lithium secondary battery has an adhesion smaller than the lower limit, the ingredients of the negative electrode may be separated out and a change in volume of the active material may not be controlled. When the negative electrode active material layer has an adhesion higher than the upper limit, the finished negative electrode active material layer shows brittleness.

The adhesion force may be tested out as follows: 2 wt % of the binder for a negative electrode of a lithium secondary battery and 98 wt % of an active material are used as solid content and water is used as a dispersion medium to prepare a dispersion having a solid content of 55 wt %. Next, the dispersion is coated and dried on a negative electrode current collector at a loading amount of 100 mg/25 cm², followed by drying, to provide a negative electrode having an active material layer. Next, the negative electrode is sampled by cutting it into a width of 15 mm. Then, the negative electrode is mounted to a UTM (Kipae E & T), and the force is determined, when the negative electrode active material layer is detached from the negative electrode current collector by a length of 130 mm at a rate of 300 mm/min and an angle of 180°.

The binder for a negative electrode of a lithium secondary battery allows a finished negative electrode active material layer to have excellent tensile strength. Preferably, the binder for a negative electrode of a lithium secondary battery according to the present disclosure may have a tensile strength of 80-120 MPa, or 90-100 MPa. When the binder for a negative electrode of a lithium secondary battery has the above-defined range of tensile strength, the finished negative electrode, particularly negative electrode active material layer, satisfies high mechanical strength and has an effect of preventing volumetric swelling of the negative electrode active material present in the finished negative electrode active material layer.

The tensile strength may be tested as follows: 2 g of the binder is dispersed in 14.6 g of water as a dispersion medium, and the dispersed composition is coated on a release substrate made of a Teflon box to a thickness of 180 μm and dried naturally to form a film. Then, the film is cut and vacuum dried at 100° C. for 24 hours to remove water. After that, the film, from which water is removed, is detached from the release substrate, and fixed to a tensile strength measuring system (KyoungSung Testing Machine Co., Ltd.) at a gauge length of 65 mm. The binder film is drawn upwardly and downwardly at a rate of 20 mm/min and the force at break is determined.

According to the present disclosure, the binder is used in combination with a silicon-based negative electrode active material to effectively solve the problem of volumetric swelling of the negative electrode active material during charge/discharge.

In another aspect of the present disclosure, there is provided a negative electrode for a lithium secondary battery, which includes a negative electrode active material, a conductive material and a binder, wherein the binder includes a copolymer containing acrylamide monomer-derived repeating units, acrylic acid monomer-derived repeating units, sodium acrylate monomer-derived repeating units and acrylonitrile monomer-derived repeating units, and the combined weight of the acrylic acid monomer-derived repeating units and sodium acrylate monomer-derived repeating units in the copolymer is 25-35 wt %, as described above; and the negative electrode active material is a silicon-based negative electrode active material.

According to an embodiment of the present disclosure, particular examples of the silicon-based negative electrode active material include at least one selected from the group consisting of Si, silicon oxide particles ($SiO_x$, $0<x\leq2$), Si-metal alloys, and alloys of Si with silicon oxide particles ($SiO_x$, $0<x\leq2$), wherein the silicon oxide particles ($SiO_x$, $0<x\leq2$) may be a composite including crystalline $SiO_2$ and amorphous Si.

According to an embodiment of the present disclosure, in addition to the silicon-based negative electrode active material, the negative electrode active material may include a combination of a carbonaceous material capable of lithium ion intercalation/deintercalation, lithium metal, tin, or the like. Preferably, a carbonaceous material may be used, the carbonaceous material including both low-crystalline carbon and highly crystalline carbon. Typical examples of the low-crystalline carbon include soft carbon and hard carbon, and those of the highly crystalline carbon include natural graphite, kish graphite, pyrolytic carbon, mesophase pitch-based carbon fibers, meso-carbon microbeads, mesophase pitches, high-temperature baked carbon, such as petroleum or coal tar pitch-derived cokes, or the like.

According to an embodiment of the present disclosure, the negative electrode for a lithium secondary battery may further include a carbonaceous negative electrode active material, in addition to the silicon-based negative electrode active material. Herein, the silicon-based negative electrode active material may be used in an amount of 1-30 wt %, or 5-10 wt %, based on the total weight of the negative electrode active materials. Particularly, the carbonaceous negative electrode active material may be natural graphite, artificial graphite, or a mixture thereof.

The negative electrode may be obtained by introducing a negative electrode active material, a binder and a conductive material to a dispersion medium, agitating and mixing them to prepare a negative electrode mixture slurry, and coating the negative electrode mixture slurry on a negative electrode current collector, followed by drying and pressing.

According to an embodiment of the present disclosure, the agitation may be carried out at a rate of 100-2,200 rpm, 100-800 rpm, or 200-500 rpm. When the agitation rate satisfies the above-defined range, the binder according to the present disclosure may be positioned at suitable positions among the negative electrode active material and conductive material. In other words, acrylamide (PAM) monomer-derived repeating units may be disposed toward the surface of the active material particles and/or conductive material particles and attached thereto, and acrylonitrile monomer-derived repeating units may be disposed in the opposite direction to the attachment to the conductive material particles and/or active material particles. In addition, it is possible to prevent the problems caused by an excessive agitation rate, i.e. damage upon the negative electrode active material caused by external physical force, or deformation of the structure of the negative electrode active material.

The agitation may be carried out for 30 minutes to 12 hours, particularly 30 minutes to 6 hours, or 1-3 hours. When the agitation time satisfies the above-defined range, the binder according to the present disclosure may be positioned at suitable positions among the negative electrode active material and conductive material. In addition, it is possible to prevent the problems caused by an excessive agitation time, i.e. damage upon the negative electrode active material caused by external physical force, or deformation of the structure of the negative electrode active material.

The agitation may be carried out at a temperature of 20-60° C., particularly at a temperature of 25-45° C., or 25-35° C.

The solvent used for forming the negative electrode may include an organic solvent, such as N-methyl pyrrolidone (NMP), dimethyl formamide (DMF), acetone, dimethyl acetamide, or the like, or water. Such solvents may be used alone or in combination.

The solvent may be used in an amount sufficient to dissolve and disperse the negative electrode active material, the binder and the conductive material therein, considering the slurry coating thickness, production yield, or the like.

The binder for a negative electrode of a lithium secondary battery including a copolymer containing acrylamide monomer-derived repeating units, acrylic acid monomer-derived repeating units, sodium acrylate monomer-derived repeating units and acrylonitrile monomer-derived repeating units may be used in an amount of 20 wt % or less, particularly 0.1-30 wt %, 0.5-20 wt %, 0.5-10 wt %, or 0.5-4 wt %, based on the weight of the active material forming the negative electrode. When the content of the binder satisfies the above-defined range, it is possible to solve the problem of an insufficient effect caused by the use of an excessively small amount of the binder, and the problem of a decrease in relative content of the active material and degradation of the capacity per volume, caused by the use of an excessively large amount of the binder.

The conductive material is not particularly limited, as long as it has conductivity, while not causing any chemical change in the corresponding battery. Particular examples of the conductive material include: graphite, such as natural graphite or artificial graphite; carbon black, such as acetylene black, Ketjen black, channel black, furnace black, lamp black or thermal black; conductive fibers, such as carbon fibers or metallic fibers; metal powder, such as fluorocarbon, aluminum or nickel powder; conductive whisker, such as zinc oxide or potassium titanate; conductive metal oxide, such as titanium oxide; or a conductive material, such as a polyphenylene derivative; or the like. The conductive material may be used in an amount of 1-30 wt %, based on the total weight of the negative electrode active material composition.

According to an embodiment of the present disclosure, the negative electrode current collector used for the negative electrode may have a thickness of 3-500 μm. The negative electrode current collector is not particularly limited, as long as it has conductivity, while not causing any chemical change in the corresponding battery. Particular examples of the negative electrode current collector include copper, gold, stainless steel, aluminum, nickel, titanium, baked carbon, copper or stainless steel surface-treated with carbon, nickel, titanium, silver, etc., aluminum-cadmium alloy, or the like.

In addition, fine surface irregularities may be formed on the surface of the negative electrode current collector to reinforce the binding force to the negative electrode active material. The negative electrode current collector may be used in various shapes, including a film, sheet, foil, net, porous body, foamed body, non-woven web, or the like.

The negative electrode mixture slurry may include a viscosity modifier and/or a filler, if necessary.

The viscosity modifier may include carboxymethyl cellulose, polyacrylic acid, or the like. Addition of the viscosity modifier to the negative electrode mixture slurry provides the negative electrode mixture slurry with viscosity controlled in such a manner that the preparation of the negative electrode mixture slurry and coating of the current collector with the negative electrode mixture slurry may be facilitated.

The filler is a supplementary ingredient which inhibits swelling of the electrode. Such a filler is not particularly limited, as long as it is a fibrous material, while not causing any chemical change in the corresponding battery. Particular examples of the filler include: olefinic polymers, such as polyethylene or polypropylene; and fibrous materials, such as glass fibers or carbon fibers.

The positive electrode may be obtained by the conventional method known to those skilled in the art. For example, the positive electrode may be obtained by mixing and agitating a positive electrode active material with a solvent, a binder, a conductive material and a dispersing agent to form a slurry, and applying (coating) the slurry onto a metallic current collector, followed by drying and pressing.

The metallic current collector is a highly conductive metal to which the positive electrode active material slurry may be adhered with ease. The metallic current collector is not particularly limited, as long as it has high conductivity, while not causing any chemical change in the corresponding battery in the voltage range of the battery. Particular examples of the current collector include stainless steel, aluminum, nickel, titanium, baked carbon, or aluminum or stainless steel surface-treated with carbon, nickel, titanium, silver, etc., or the like. In addition, fine surface irregularities may be formed on the surface of the positive electrode current collector to reinforce the binding force to the positive electrode active material. The positive electrode current collector may be used in various shapes, including a film, sheet, foil, net, porous body, foamed body, non-woven web, or the like, and may have a thickness of 3-500 μm.

Particular examples of the positive electrode active material may include, but are not limited to: lithium cobalt oxide ($LiCoO_2$); lithium nickel oxide ($LiNiO_2$); $Li[Ni_aCo_bMn_cM1_d]O_2$ (wherein M1 is at least one element selected from the group consisting of Al, Ga and In, $0.3 \leq a < 1.0$, $0 \leq b \leq 0.5$, $0 \leq c \leq 0.5$, $0 \leq d \leq 0.1$, and $a+b+c+d=1$); layered compounds, such as $Li(Li_eM2_{f-e-f}M3_f)O_2$-gAg (wherein $0 \leq e \leq 0.2$, $0.6 \leq f \leq 1$, $0 \leq f \leq 0.2$, $0 \leq g \leq 0.2$, M2 includes Mn and at least one selected from the group consisting of Ni, Co, Fe, Cr, V, Cu, Zn and Ti, M3 is at least one selected from the group consisting of Al, Mg and B, and A is at least one selected from the group consisting of P, F, S and N), or those compounds substituted with one or more transition metals; lithium manganese oxides such as those represented by the chemical formula of $Li_{1+h}Mn_{2-h}O_4$ (wherein $0 \leq h \leq 0.33$), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-i}M4_iO_2$ (wherein M4 is Co, Mn, Al, Cu, Fe, Mg, B or Ga, and $0.01 \leq I \leq 0.3$); lithium manganese composite oxides represented by the chemical formula of $LiMn_{2-j}M5_jO_2$ (wherein M5 is Co, Ni, Fe, Cr, Zn or Ta, and $0.01 \leq j \leq 0.1$) or $Li_2Mn_3M6O_8$ (wherein M6 is Fe, Co, Ni, Cu or Zn); $LiMn_2O_4$ in which Li is partially substituted with an alkaline earth metal ion; disulfide compounds; $LiFe_3O_4$, $Fe_2(MoO_4)_3$, or the like.

The solvent used for forming the positive electrode include an organic solvent, such as N-methyl pyrrolidone (NMP), dimethyl formamide (DMF), acetone or dimethyl acetamide, or water. Such solvents may be used alone or in combination.

The solvent may be used in an amount sufficient to dissolve and disperse the positive electrode active material, the binder and the conductive material therein, considering the slurry coating thickness, production yield, or the like.

The binder functions to improve the adhesion of the positive electrode active material particles among themselves and the adhesion between the positive electrode active material and the positive electrode current collector. Particular examples of the binder include polyvinylidene fluoride (PVDF), polyvinylidene fluoride-co-hexafluoropropylene (PVDF-co-HFP), polyvinyl alcohol, polyacrylonitrile, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber (SBR), fluororubber, various copolymers thereof, or the like. Such binders may be used alone or in combination. The binder may be used in an amount of 1-30 wt % based on the total solid content of the ingredients forming the positive electrode.

The conductive material is not particularly limited, as long as it has conductivity, while not causing any chemical change in the corresponding battery. Particular examples of the conductive material include: graphite, such as natural graphite or artificial graphite; carbon black, such as acetylene black, Ketjen black, channel black, furnace black, lamp black or thermal black; conductive fibers, such as carbon fibers or metallic fibers; conductive tubes, such as carbon nanotubes; metal powder, such as fluorocarbon, aluminum or nickel powder; conductive whisker, such as zinc oxide or potassium titanate; conductive metal oxide, such as titanium oxide; conductive materials, such as a polyphenylene derivative; or the like. The conductive material may be used in an amount of 1-20 wt % based on the total weight of the positive electrode slurry.

The dispersing agent may be an aqueous dispersing agent, such as water, or an organic dispersing agent, such as N-methyl-2-pyrrolidone.

Meanwhile, the separator may be a porous polymer film used conventionally as a separator, such as a porous polymer film made of a polyolefinic polymer, including ethylene homopolymer, propylene homopolymer, ethylene-butene copolymer, ethylene-hexene copolymer or ethylene-methacrylate copolymer, and may be used alone or in the form of a laminate. A porous non-woven web, such as a non-woven web made of high-melting point glass fibers or polyethylene terephthalate fibers, may also be used as a separator. However, the scope of the present disclosure is not limited thereto.

According to an embodiment of the present disclosure, any lithium salt used conventionally for an electrolyte for a lithium secondary battery may be used with no particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

According to an embodiment of the present disclosure, the organic solvent contained in the electrolyte may be any organic solvent used conventionally for an electrolyte for a secondary battery with no particular limitation. Typical examples of the organic solvent include at least one selected from the group consisting of propylene carbonate (PC), ethylene carbonate (EC), diethyl carbonate (DEC), dimethyl carbonate (DMC), ethyl methyl carbonate (EMC), methyl propyl carbonate, dipropyl carbonate, dimethyl sulfoxide, acetonitrile, dimethoxyethane, diethoxyethane, vinylene carbonate, sulfolane, gamma-butyrolactone, propylene sulfite, and tetrahydrofuran. Particularly, among the carbonate-based organic solvents, ethylene carbonate and propylene carbonate, which are cyclic carbonates, are organic solvents having high viscosity and a high dielectric constant, and thus may be used preferably, since they can dissociate the lithium salt in the electrolyte with ease. When such a cyclic carbonate is used after mixing it with a linear carbonate having low viscosity and a low dielectric constant, such as dimethyl carbonate or diethyl carbonate, at an adequate ratio, it is possible to prepare an electrolyte having higher electrical conductivity, more preferably.

Optionally, the electrolyte used according to the present disclosure may further include additives contained in the conventional electrolyte, such as an overcharge-preventing agent, or the like.

The lithium secondary battery according to the present disclosure may be provided in a cylindrical shape using a can, prismatic shape, pouch-like shape or a coin-like shape, but is not limited thereto.

The lithium secondary battery according to the present disclosure may be used for a battery cell used as a power source for a compact device, and may be used preferably as a unit cell for a medium- or large-size battery module including a plurality of battery cells.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Preparation Example 1: Preparation of Binder

First, acrylamide, acrylic acid, methyl acrylate and acrylonitrile were prepared in an amount of 60 wt %, 10 wt %, 25 wt % and 5 wt %, respectively.

Acrylonitrile was mixed with bromoform at a volume ratio of 25:15, particularly 25 mL:15 mL, and the mixture was introduced to an ice bath and irradiated with light for 3 hours. The resultant polyacrylonitrile resin was washed with methanol and acetone, followed by drying.

The resultant polyacrylonitrile was introduced to a test tube together with acrylic acid, bromoform diluted with benzene was introduced thereto, and the test tube is covered with a lid and irradiated with light for 45-90 minutes. Next, the resultant resin was washed with benzene several times and freeze-dried to obtain about 3 g of polyacrylonitrile-co-polyacrylic acid (PAN-PAA).

Then, PAN-PAA and methyl acrylate were dissolved in benzene and the mixture was agitated, benzoyl peroxide was introduced thereto as an initiator, 1-butanethiol was introduced thereto as a reactant, and the resultant mixture was warmed to a temperature of 110° C. under nitrogen atmosphere. After carrying out reaction for 4 hours, the initiator and monomer were washed with methanol, the resultant powdery particles were introduced to an excessive amount of n-hexane, an excessive amount of NaOH solution was introduced thereto so that methyl groups of methyl acrylate might be substituted with $Na^+$ ions, and the resultant powdery particles were dried.

PAN-PAA-PAA $Na^+$ copolymer was dissolved in 100 cc of bromoform, 2 g of acrylamide was introduced thereto under an oxygen-free condition, the reaction system was covered and sealed with a lid, and then light was irradiated thereto at 25-35° C. for 2 hours. After completing the light irradiation, the resultant product was washed with methanol three times and washed with acetone, and then freeze-dried to obtain a powder particle-shaped product.

PAN-PAA-PAA Na copolymer was introduced to an organic solvent for polymer synthesis, acrylamide was introduced thereto under an oxygen-free condition, and photo-polymerization was carried out under a sealed environment. The photo-polymerization may be carried out at a temperature of 25-35° C. for 2 hours. Powdery particles were obtained as a final product, and the powdery particles were freeze-dried.

The resultant binder for a negative electrode of a lithium secondary battery includes a copolymer containing 60 wt % of acrylamide monomer-derived repeating units, 10 wt % of acrylic acid monomer-derived repeating units, 25 wt % of sodium acrylate monomer-derived repeating units and 5 wt % of acrylonitrile monomer-derived repeating units, wherein the combined weight of the acrylic acid monomer-derived repeating units and sodium acrylate monomer-derived repeating units is 25-35 wt %.

Example 1: Manufacture of Binder Film

First, 2 g of the binder obtained from Preparation Example 1 was dispersed in 14.6 g of water as a dispersion medium. Next, the dispersed composition was coated on a release substrate made of a Teflon box to a thickness of 180 μm and dried naturally to obtain a binder film. The resultant binder film was cut and vacuum dried at 100° C. for 24 hours to remove water.

Example 2: Manufacture of Binder Film

First, 2 g of the binder obtained from Preparation Example 1 was dispersed in 14.6 g of water as a dispersion medium. Next, the dispersed composition was coated on a release substrate made of a Teflon box to a thickness of 180 μm and dried naturally to obtain a binder film. The resultant binder film was cut and vacuum dried at 130° C. for 24 hours to remove water.

Comparative Example 1: Manufacture of Binder Film

First, styrene butadiene rubber particles and carboxymethyl cellulose particles were prepared at a weight ratio of 2:1 in a total amount of 2 g, and was dispersed in 14.6 g of water as a dispersion medium. Next, the dispersed composition was coated on a release substrate made of a Teflon box to a thickness of 180 μm and dried naturally to obtain a binder film. The resultant binder film was cut and vacuum dried at 100° C. for 24 hours to remove water.

Example A: Manufacture of Negative Electrode

The binder obtained from Preparation Example 1 was used in an amount of 2 wt %, Si as a negative electrode active material was used in an amount of 98 wt %, and water was used as a dispersion medium to prepare a dispersion the solid content of the binder and active material at a concentration of 55 wt %.

Then, the dispersion was coated on a negative electrode current collector at a loading amount of 100 mg/25 cm$^2$, followed by drying, to provide a negative electrode having an active material layer. The negative electrode was cut into a width of 15 mm to prepare a finished negative electrode.

Comparative Example A: Manufacture of Negative Electrode

Styrene butadiene rubber particles and carboxymethyl cellulose particles were used at a weight ratio of 2:1 in a total amount of 2 wt %, Si as a negative electrode active material was used in an amount of 98 wt %, and water was used as a dispersion medium to prepare a dispersion the solid content of the binders and active material at a concentration of 55 wt %.

Then, the dispersion was coated on a negative electrode current collector at a loading amount of 100 mg/25 cm$^2$, followed by drying, to provide a negative electrode having an active material layer. The negative electrode was cut into a width of 15 mm to prepare a finished negative electrode.

Example (I): Manufacture of Lithium Secondary Battery

First, 129 g of the dispersion of the binder for a negative electrode of a lithium secondary battery obtained from Example 1 (binder particles 17.04 g, solid content: about 13% based on deionized water), 60 g of Si as a negative electrode active material, and 9 g of carbon black as a conductive material were introduced to 85 g of water and agitated therein at room temperature to obtain a negative electrode mixture slurry. In the resultant negative electrode mixture slurry, the acrylamide monomer-derived repeating units in the binder were disposed toward the surface of each of the conductive material particles and active material particles, while the acrylic acid monomer-derived repeating units and sodium acrylate monomer-derived repeating units were disposed in the opposite direction to the surface of each of the conductive material particles and active material particles. Herein, the weight ratio of the negative electrode active material:conductive material:binder polymer was 70:10:20.

The negative electrode mixture slurry was coated on one surface of a copper current collector having a thickness of 8 μm at a loading amount of 68.3/25 cm$^2$, followed by drying, to obtain a negative electrode.

Then, 96 g of LiCoO$_2$ as a positive electrode active material, 2 g of acetylene black and 2 g of polyvinylidene fluoride (PVDF) as a binder were added to N-methyl-2-pyrrolidone (NMP) as a solvent to prepare a positive electrode mixture slurry. The positive electrode mixture slurry was coated on aluminum (Al) foil to a thickness of 350 μm, followed by drying, to obtain a positive electrode. Then, roll pressing was carried out to obtain a positive electrode.

The negative electrode obtained as described above was punched into a surface area of 13.33 cm$^2$, and the positive electrode obtained as described above was punched into a surface area of 12.60 cm$^2$ to obtain a mono-cell. Then, a tab was attached to the top of each of the positive electrode and negative electrode, a separator made of a polyolefin microporous film was interposed between the negative electrode and the positive electrode, the resultant structure was received in an aluminum pouch, and 500 mg of an electrolyte was injected into the pouch. The electrolyte was prepared by using a mixed solvent containing fluoroethylene carbonate (FEC) and diethyl carbonate (DEC) at a volume ratio of 3:7, adding 3 wt % of vinylene carbonate as an additive thereto, and dissolving LiPF$_6$ electrolyte to a concentration of 1 M.

Then, the pouch was sealed by using a vacuum packaging device and allowed to stand at room temperature for 12 hours, and then subjected to a constant-voltage charging process by charging the cell under a constant-current condition at about 0.05 C rate and maintaining the voltage until about ⅙ of electric current. Herein, since gas was generated in the cell, degassing and resealing processes were carried out to finish a lithium secondary battery.

Comparative Example (I): Manufacture of Lithium Secondary Battery

A negative electrode was obtained in the same manner as Example 1, except that 7 g of a styrene butadiene rubber solution (SBR particles 2.6 g, solid content: 40% based on water) and 117.85 g of carboxymethyl cellulose (CMC) solution (CMC powder 1.3 g, solid content: 1.1% based on water) were used as binders, and any separate solvent or dispersion medium was not used. A lithium secondary battery was obtained in the same manner as Example 1, except that the obtained negative electrode was used. Herein, styrene butadiene rubber and carboxymethyl cellulose were provided in the form of a two-part binder, and each of them was stored in a separate container.

Test Example 1: Determination of Binder Adhesion

A negative electrode was prepared in the same manner as described in Example A and Comparative Example A. Then, the negative electrode was mounted to a UTM (Kipae E&T), and the force was determined, when the negative electrode active material layer was detached from the negative electrode current collector by a length of 130 mm at a rate of 300 mm/min and an angle of 180°.

As shown in FIG. 1, the binder film according to Example A shows higher peel strength, which demonstrates that the binder according to Example A has higher adhesion as compared to the binder according to Comparative Example A.

Test Example 2: Determination of Tensile Strength of Binder Film

The binder films according to Examples 1 and 2 and the binder film according to Comparative Example 1 were prepared. Each of the binder films was fixed to a tensile strength measuring system (KyoungSung Testing Machine Co., Ltd.) at a gauge length of 65 mm. The binder film was drawn upwardly and downwardly at a rate of 20 mm/min and the force at break was determined. The results are shown in FIG. 2.

Figure 2:
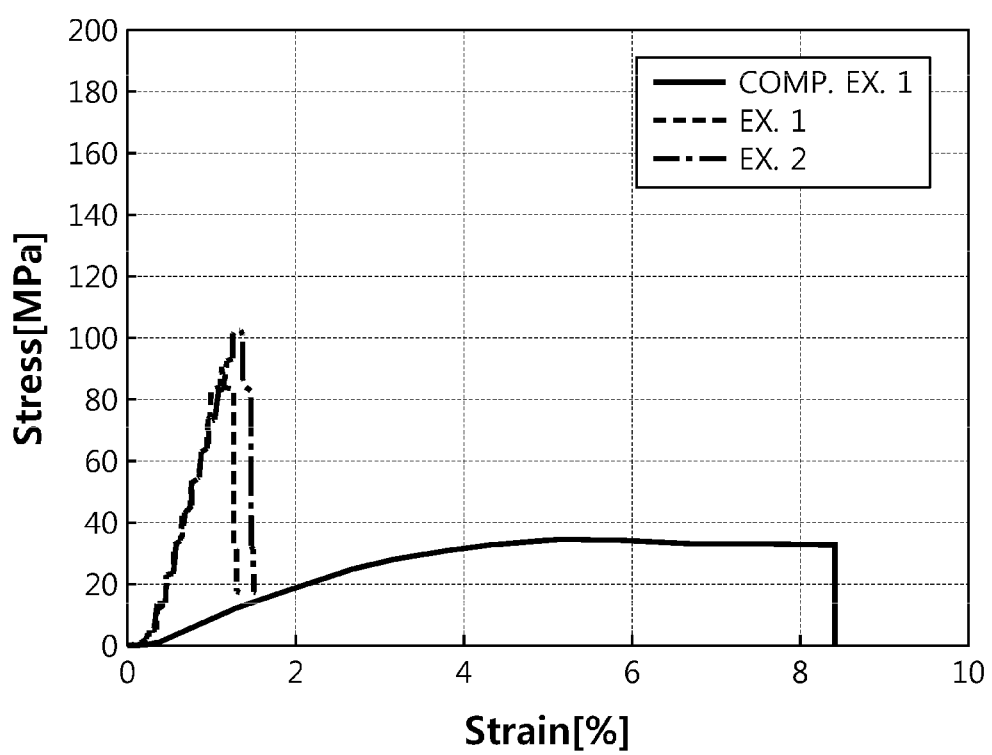
FIG. 2 is a graph illustrating the tensile strength of the binder film according to an embodiment of the present disclosure.

It can be seen from FIG. 2 that the binder films according to Examples 1 and 2 show a higher tensile strength, as compared to the binder film according to Comparative Example 1.

Test Example 3: Determination of Dispersibility

Figure 3:
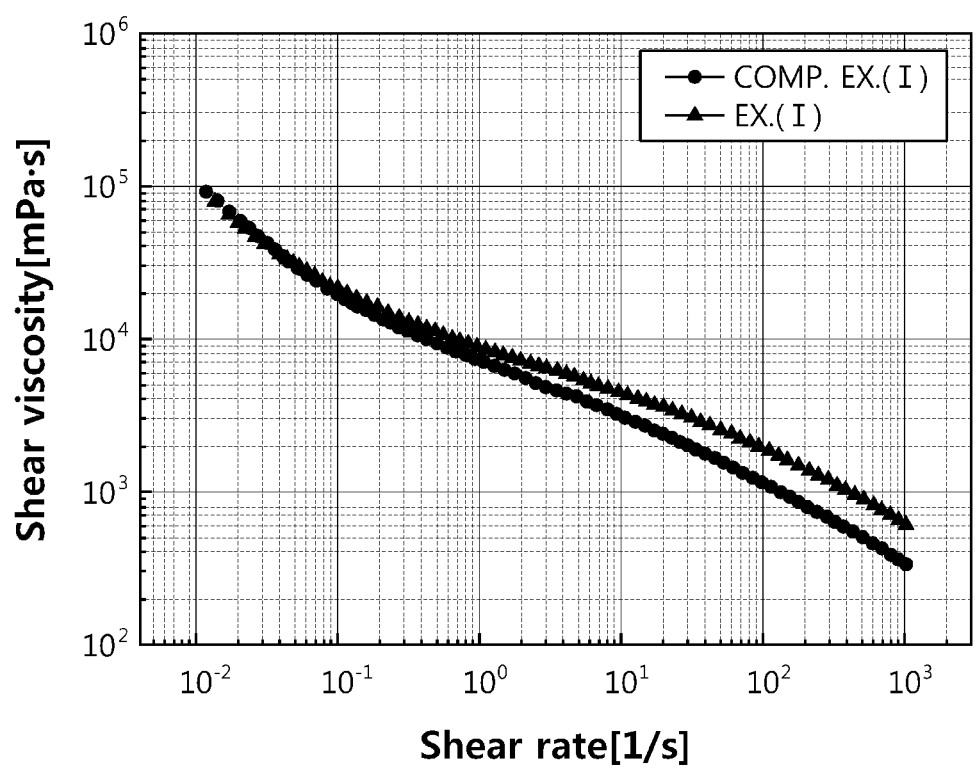
FIG. 3 is a graph illustrating the dispersibility of the negative electrode mixture slurry according to an embodiment of the present disclosure.

First, 10 mL of the negative electrode mixture slurry obtained in the same manner as Example (I) and Comparative Example (I), except that the active material, the conductive material and the binder were used at a ratio of 70:10:20, was introduced to a rheological property analyzer (TA instrument Trios). Then, viscosity was measured as a function of shear rate in a range from 0.01 to 1000 l/s at 25° C. The results are shown in FIG. 3. As shown in FIG. 3, the negative electrode mixture slurry according to Example (I) has a viscosity of less than 10000 mPa·s at a shear rate of 1 l/s, which suggests that it has a desired level of dispersibility similar to the dispersibility according to Comparative Example (I).

Test Example 4: Determination of Capacity Retention of Lithium Secondary Battery Each of the lithium secondary batteries obtained according to Example (I) and Comparative Example (I) was subjected to a charge/discharge test 50 times at a charge/discharge current density of 0.5 C with a charge cutoff voltage of 4.2 V (Li/Li$^+$) and a discharge cutoff voltage of 3 V (Li/Li$^+$).

All charging processes were carried out under a constant-current/constant-voltage condition, wherein the cutoff current of a constant-voltage charging process was 0.05 C. After completing total 50 cycles of tests, the discharge capacity determined at each cycle is shown in FIG. 4, when the initial discharge capacity is taken as 100%.

Figure 4:
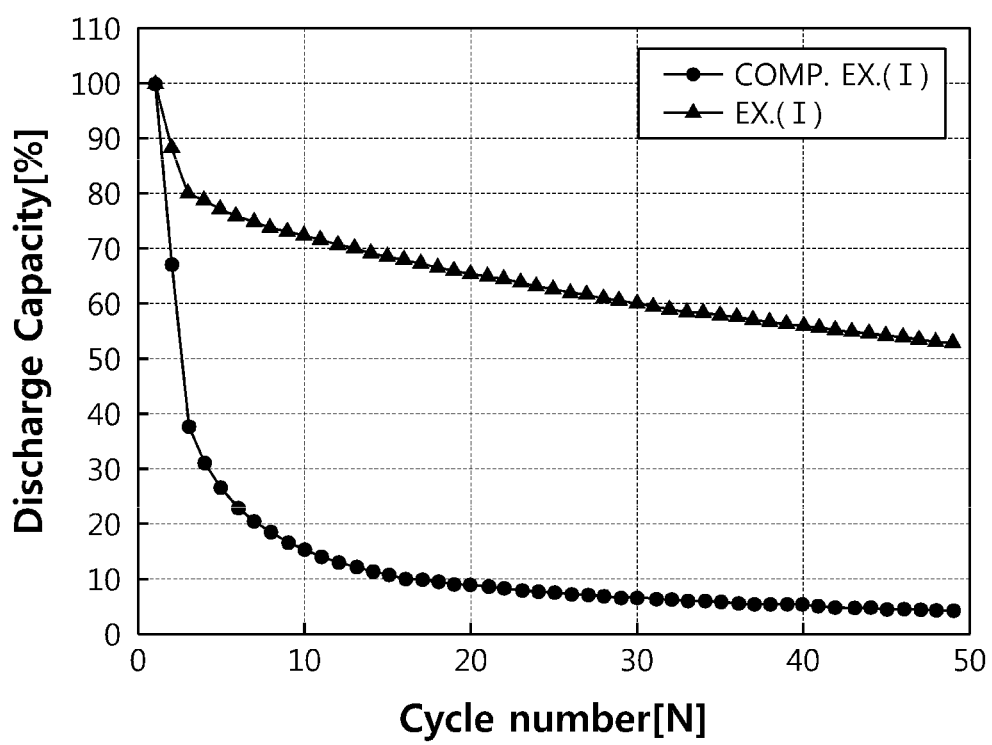
FIG. 4 is a graph illustrating the capacity retention of the lithium secondary battery including the negative electrodes according to each of Example 1 and Comparative Example 1.

It can be seen from FIG. 4 that the lithium secondary battery according to Example (I) shows a significantly low decrease in capacity retention as a function of cycle number, as compared to the lithium secondary battery according to Comparative Example (I). Therefore, it is shown that the lithium secondary battery according to Example (I) has higher life characteristics as compared to the lithium secondary battery according to Comparative Example (I). It is thought that this is because deterioration of a lithium secondary battery caused by detachment of a Si negative electrode active material undergoing high volumetric swelling during charge/discharge is significantly reduced, in the case of the lithium secondary battery according to Example (I).

What is claimed is:

1. A negative electrode for a lithium secondary battery, which comprises:
   negative electrode active material particles,
   a conductive material, and
   a binder,
   wherein the binder comprises:
   a copolymer comprising acrylamide monomer-derived repeating units, acrylic acid monomer-derived repeating units, sodium acrylate monomer-derived repeating units and acrylonitrile monomer-derived repeating units,
   wherein the copolymer comprises 60 wt % to 65 wt % of acrylamide monomer-derived repeating units, 5 wt % to 10 wt % of acrylic acid monomer-derived repeating units, 15 wt % to 25 wt % of sodium acrylate monomer-derived repeating units and 5 wt % to 15 wt % of acrylonitrile monomer-derived repeating units,
   wherein a combined weight of the acrylic acid monomer-derived repeating units and sodium acrylate monomer-derived repeating units in the copolymer is 25 wt % to 35 wt %, and
   wherein the negative electrode active material particles are silicon-based negative electrode active material particles.

2. The negative electrode for the lithium secondary battery according to claim 1, wherein the acrylamide monomer-derived repeating units in the copolymer are disposed toward a surface of the negative electrode active material particles, and the acrylonitrile monomer-derived repeating units are disposed in a direction opposite to the surface of the negative electrode active material particles.

3. The negative electrode for a lithium secondary battery according to claim 1, wherein the negative electrode active material particles are Si- or SiO-based active material particles.

4. The negative electrode for a lithium secondary battery according to claim 1, which has a tensile strength of 80 MPa to 120 MPa.

5. The negative electrode for the lithium secondary battery according to claim 1, which has an adhesion force of 15 gf/15 mm to 100 gf/15 mm.

6. The negative electrode for the lithium secondary battery according to claim 1, wherein the copolymer consists of acrylamide monomer-derived repeating units, acrylic acid monomer-derived repeating units, sodium acrylate monomer-derived repeating units and acrylonitrile monomer-derived repeating units.

7. A lithium secondary battery comprising the negative electrode for the lithium secondary battery as defined in claim 1.

* * * * *